Sept. 27, 1927.  K. ROTTGARDT  1,643,787
CONTROL UNIT FOR VARIABLE INSTRUMENTS
Filed Aug. 29, 1921
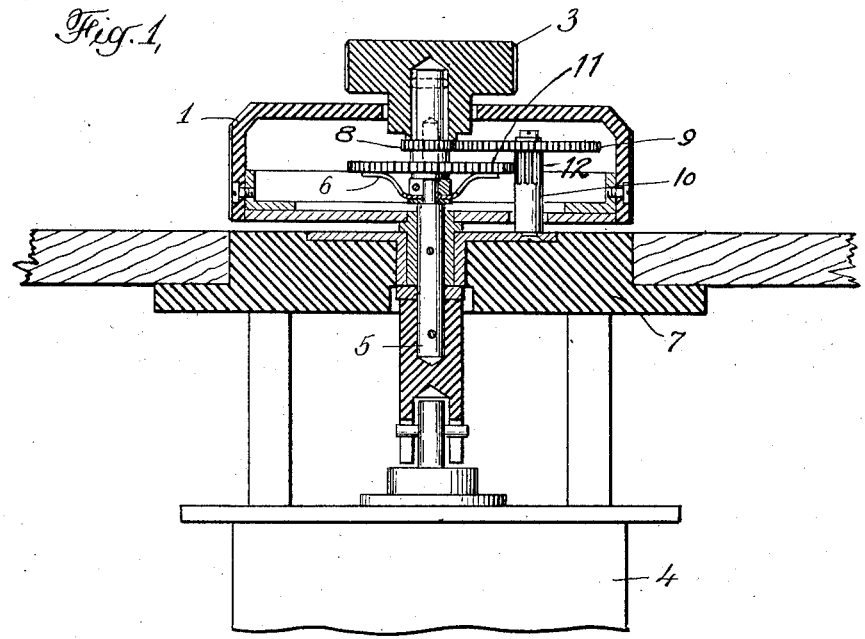
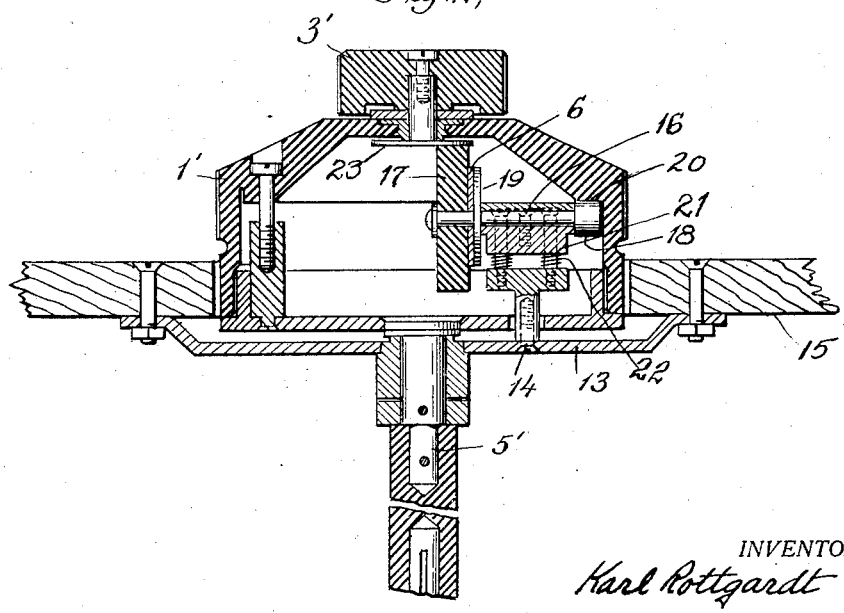
INVENTOR
Karl Rottgardt
BY
Pennie, Davis, Marvin and Edmonds
ATTORNEYS Patented Sept. 27, 1927.

1,643,787

UNITED STATES PATENT OFFICE.

KARL ROTTGARDT, OF DAHLEM, NEAR BERLIN, GERMANY, ASSIGNOR TO WESTINGHOUSE ELECTRIC & MANUFACTURING COMPANY, A CORPORATION OF PENNSYLVANIA.

CONTROL UNIT FOR VARIABLE INSTRUMENTS.

Application filed August 29, 1921, Serial No. 496,433, and in Germany November 2, 1918.

The invention refers to adjustment devices for apparatus such as condensers and variometers for radiotelegraphy in which it is necessary to make provision not only for approximate adjustments of movable members, but also for accurate adjustments of such members. According to the invention such adjustment device is designed in such a manner as to be handy, convenient and compact in spite of the fact of its affording the possibility of a double range of adjustments. The invention attains this purpose by making provision for two separate handles arranged as a rule one inside the other, and intended respectively for the accurate and the approximate adjustment, and for a transmission gearing making possible the accurate adjustment, which transmission gearing is located inside the handle for the approximate adjustment. There is obtained in this manner an extremely compact design of the two handles, which can be arranged on the same axis, the large handle acting as bearing for the axis or spindle of the small handle. Such arrangement makes it possible to operate conveniently both handles in succession with a single hand. The contemplated design makes it possible to consolidate the entire adjustment contrivance into a compact unit which can be conveniently mounted on the apparatus in question as a mere adjunct and can be easily taken down or removed wherever it is desired to do so. The transmission gearing enclosed in the large handle may be conveniently provided with a sliding coupling whereby the driven spindle is coupled with the small handle only in case an accurate adjustment is desired, but which remain inoperative when the large handle is used. It is also advisable to give to the transmission the form of a friction gearing in order to do away for instance with the clearance which cannot be avoided in case of toothed gears. The simplification of the entire arrangement is promoted by utilizing the large handle as a member of the transmission gear inserted in front of the small handle, for instance by having a friction or toothed wheel of this gearing mesh with a likewise designed member on the inner wall of the large handle.

A clearer understanding of this invention may be had from the following description of the preferred embodiments which are illustrated in the accompanying drawing. In this drawing.

Fig. 1 illustrates a control unit comprising two handles which are operatively connected by means of toothed gears;

Fig. 2 illustrates a similar control unit in which the two handles are connected by means of frictional gears.

Referring now to Fig. 1, a handle 1 having an interior recessed portion is securely attached to a shaft 5, which is journaled in an insulating member 7, and is releasably connected to the shaft of a variable instrument 4, which may be a condenser or a variometer for use in wireless receiving or transmitting devices. On an extended portion of the shaft 5 a smaller handle 3 is revolubly mounted so that a portion of the smaller handle extends within the handle 1. A pinion gear 8 is securely attached to the shaft of handle 3, and meshes with a larger pinion gear 9, which is carried on a revoluble shaft 10. This shaft 10 may be mounted on the insulating block 7, a portion of the handle 1 being cut away to allow free movement thereof. A pinion 11, which is revolubly mounted on the shaft 5, engages with a second pinion 12, which is preferably cut on the shaft 10. A spring thrust 6, which is securely attached to the shaft 5 and bears against the pinion 11, is adapted to transmit motion from the pinion 11 to the shaft 5 and thus to the variable device 4. The use of a frictional spring engagement between the pinion 11 and the shaft 5 is highly advantageous, as when adjustments are made by means of the handle 3, due to the small speeds and forces involved, the friction will be effective in connecting the pinion 11 with the shaft 5, but when adjustment is made through handle 1, the relative speed of handle 3 is so much greater that pinion 11 will slip with respect to the spring thrust 6 so that the handle 3 will not turn.

Adjustment of the variable device 4 by means of this arrangement may be made as follows:

By turning the handle 1 the variable device 4 is adjusted approximately. The small handle 3 is then turned, and motion is transmitted through the gear train 8, 9, 12, 11 and the thrust spring 6 to the shaft 5. It will be seen that because of the relative sizes of the gears, for a given angle of rotation of the handle 3, the handle 1 and consequently the variable device 4, will move through a relatively smaller angle, and extremely accurate adjustment of the variable device 4 may be made.

In Fig. 2 a modified form of control unit is shown in which frictional gearing is employed instead of toothed wheel gearing, as it is found that accurate adjustment is impossible with toothed wheel gearing because of the back lash in the gearing which occurs after the gears have become slightly worn and is unavoidable. In this embodiment the handle 1', to which is securely attached the shaft 5', is journaled in a yoke 13, which is adapted to be attached to a panel 15 or other convenient support. The handle 3' is journaled in a portion of the handle 1' preferably concentrically with the shaft 5', and extends through the wall of the handle into the hollow interior. A semicircular slot is cut in the bottom portion of the handle 1' through which extends the support 14, in a portion of which is journaled a shaft 16, on one end of which is freely mounted a wheel 17, and on the other end of which is securely attached a smaller wheel 18. A plate 19 is securely attached to the shaft 16 and is frictionally engaged with the wheel 17 by means of a spring 6, which may take the form of a spring washer. The transmission members carried by the shaft 16 are positioned so that the free wheel 17 engages with the disc 23 on the end of the shaft of the handle 3' and the pinion 18 engages with the annular portion 20 of the handle 1'. In order to maintain the contact between the wheel 17 and the disc 23 and the pinion 18 and the annular portion 20, the block 21, in which the shaft 16 is journaled, is supported by means of springs 22, which bear against the support 14 and tend to force the block 21 upwards so that the parts 17 and 18 are held in good frictional engagement with the members 19 and 20 respectively.

The mode of using the handle illustrated in Fig. 2 is substantially the same as previously outlined, but the various parts, of course, function differently. An approximate adjustment is made by means of the handle 1', and the final or accurate adjustment is made by means of the handle 3'. The movement of the handle 3' is transmitted to the free wheel 17, which engages the plate 19 by means of the thrust spring 6. Motion is therefore transmitted through the shaft 16 and the pinion 20 to the handle 1'. Because of the reduction in gearing, the movement of handle 1' is relatively less than that of handle 3', which enables the accurate adjustment to be made. It will be seen that when the handle 1' is grasped, the hand of the operator will enclose the small handle 3', and tend to prevent its rotation at a greater speed than that of handle 1'. The necessary slip occurs preferably between the members 17 and 19, which are connected one with another only by means of the thrust spring 6.

It is to be understood that the foregoing description of preferred embodiments is not to at all limit the spirit and scope of this invention, as various modifications will at once be apparent to those skilled in the art.

I claim—

1. A control unit for adjustable instruments comprising a handle, means for mounting said handle on an instrument, a second handle journaled concentrically with the first-mentioned handle, and reduction gearing between said handles for transmitting motion by means of either handle, said gearing including frictional connections, whereby the first-mentioned handle may be moved in either direction without causing motion of the other handle.

2. A control unit for adjustable instruments comprising a handle, means for mounting said handle on an instrument, a second handle journaled in said first-mentioned handle and concentrically therewith, and reduction gearing between said handles for transmitting motion by means of either handle, said gearing including a device yieldable in each direction, whereby either direct or reduced motions may be transmitted in either direction.

3. A control unit for adjustable instruments comprising a handle, means for mounting said handle on an instrument, a second handle journaled in said first-mentioned handle and concentrically therewith, and reduction gearing between said handles for transmitting motion by means of either of said handles, said gearing including a friction clutch whereby one handle may be rotated without rotating the other.

4. A control unit for adjustable instruments comprising a handle having a depending annular flange forming a cavity therein, a second handle journaled concentrically with the first-mentioned handle and extending therethrough into the cavity thereof, and gearing contained within the cavity of said first-mentioned handle for transmitting motion by means of either handle.

5. A control unit for adjustable instruments comprising a handle having a depending annular flange forming a cavity therein, a second handle journaled in said first-mentioned handle and concentrically therewith extending therethrough into the cavity thereof, and gearing contained within the hollow cavity of said first-mentioned handle and connected with both handles whereby motion may be transmitted by means of either handle.

6. A control unit for adjustable instruments comprising a handle having a depending annular flange forming a cavity therein, a second handle journaled in said first-mentioned handle and concentrically therewith extending therethrough into the cavity thereof, and gearing contained within the hollow cavity of said first-mentioned handle and connected with both handles whereby motion may be transmitted by means of either handle, said gearing including a friction clutch whereby one handle may be rotated without rotating the other.

7. A control unit for adjustable instruments comprising a handle having a depending annular flange forming a cavity therein, a shaft attached to said handle, said shaft being journaled in a mounting block, a second handle journaled in said first mentioned handle and extending therethrough, reduction gearing mounted on said block and extending within the cavity in said first-mentioned handle to transmit motion from one handle to the other and including a gear frictionally engaged with said second handle, a gear frictionally engaged with said first-mentioned handle, and a slidable friction clutch interposed between said gears, said clutch permitting one handle to be rotated without rotation of the other of said handles.

8. A control device for variable electrical apparatus comprising a main knob adapted to be connected to a shaft for directly rotating said shaft, speed reducing mechanism enclosed by said main knob, and an auxiliary knob for operating said speed reducing mechanism.

9. In a control device a shaft, a handle, a plate connecting said handle to said shaft, a second handle and a slow motion device connecting said second handle to said shaft, said plate having an opening for accommodating movement thereof relative to said slow-motion device.

10. In an adjustable device, a member to be moved, a handle directly connected to said member, a second handle and a slow-motion device connecting said second handle to said member, said slow-motion device including parts having slip engagement, whereby the member may be moved in either direction by either handle.

11. The combination of a radio apparatus tuning shaft, indicating means rigid with said shaft, a handle for operating said shaft, and instrumentalities having a plurality of longitudinal and parallel and fixed axes of rotation whereby said shaft is rotated in the same direction but at a slower speed by the rotation of said handle, said instrumentalities comprising a smaller shaft whereby said handle is movably supported and which is integral with the outer end portion of said tuning shaft to communicate the motion of said handle thereto, whereby removal of the handle from said smaller shaft is necessary in order to disconnect the handle from said tuning shaft.

12. The combination of a radio apparatus tuning shaft, indicating means rigid with said shaft, a rotary handle supported entirely by and adapted for operating said shaft, extending outwardly beyond the plane of movement of said indicating means, so that the indicating means are immediately behind the handle, instrumentalities having a plurality of longitudinal and parallel and fixed axes of rotation whereby said shaft is rotated in the same direction but at a slower speed by the rotation of said handle, so that said indicating means and handle always turn in the same direction, but with the indicating means turning more slowly than the handle, said instrumentalities comprising an engaging member rigid with said handle, and means to engage said engaging member to impart slow movement to said shaft and indicating means, said shaft being necessary to maintain said engaging member in operative position.

In testimony whereof I affix my signature.

DR. KARL ROTTGARDT.